(12) United States Patent
Ding et al.

(10) Patent No.: US 11,004,472 B2
(45) Date of Patent: May 11, 2021

(54) METHOD AND DEVICE OF PLAYING VIDEO, AND COMPUTING DEVICE

(71) Applicant: Shanghai Bilibill Technology Co., LTD., Shanghai (CN)

(72) Inventors: Jianqiang Ding, Shanghai (CN); Zhaoxin Tan, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/904,197

(22) Filed: Jun. 17, 2020

(65) Prior Publication Data

US 2020/0402539 A1 Dec. 24, 2020

(30) Foreign Application Priority Data

Jun. 18, 2019 (CN) .......................... 201910526417.4

(51) Int. Cl.
*G11B 27/034* (2006.01)
*G11B 27/34* (2006.01)
*G06F 16/738* (2019.01)
*G06F 16/71* (2019.01)
*G11B 27/10* (2006.01)

(52) U.S. Cl.
CPC .......... *G11B 27/034* (2013.01); *G06F 16/71* (2019.01); *G06F 16/738* (2019.01); *G11B 27/105* (2013.01); *G11B 27/34* (2013.01)

(58) Field of Classification Search
CPC ..... G11B 27/034; G11B 27/105; G11B 27/34; G06F 16/71; G06F 16/738
See application file for complete search history.

(56) References Cited

U.S. PATENT DOCUMENTS

2017/0171278 A1* 6/2017 Yang .................... H04L 65/604

\* cited by examiner

*Primary Examiner* — Mishawn N. Hunter
(74) *Attorney, Agent, or Firm* — BakerHostetler

(57) ABSTRACT

The present disclosure describes techniques for playing videos. The disclosed techniques include obtaining a total duration and a playing duration of a first video segment; identifying a first video node corresponding to the first video segment and a first directing message associated with the first video node in a video playing plot graph, wherein the video playing plot graph is pre-generated and comprises a plurality of video nodes, and each video node corresponds to a video segment and is associated with a directing message comprising information related to a second video node; determining the second video node based on the first directing message in response to a determination that a difference between the total duration and the playing duration is equal to a predetermined amount; obtaining the second video segment based on the second video node; and playing the second video segment continuously once the first video segment is finished.

20 Claims, 5 Drawing Sheets

METHOD AND DEVICE OF PLAYING VIDEO, AND COMPUTING DEVICE

CROSS-REFERENCE TO RELATED APPLICATION

The present application claims priority of Chinese patent application number 201910526417.4, titled "method for video playing, device, and computing device," filed on Jun. 18, 2019. The entire content of the above-identified application is incorporated in the present application by reference.

TECHNICAL FIELD

The present application relates to a technical field of video playing, and particularly to a method for video playing, device, computing device, and computer readable storage medium.

BACKGROUND

Existing video websites can divide a complete video file, such as a movie, into several video segments and store them in a video resource library of a video website. Each of the divided video segments can also be identified as different video types according to different video contents, such as funny type videos, music type videos, love type videos and so on. However, existing video websites are generally only able to provide the video segments for the user to play separately.

DETAILED DESCRIPTION OF ILLUSTRATIVE EMBODIMENTS

Figure 1:
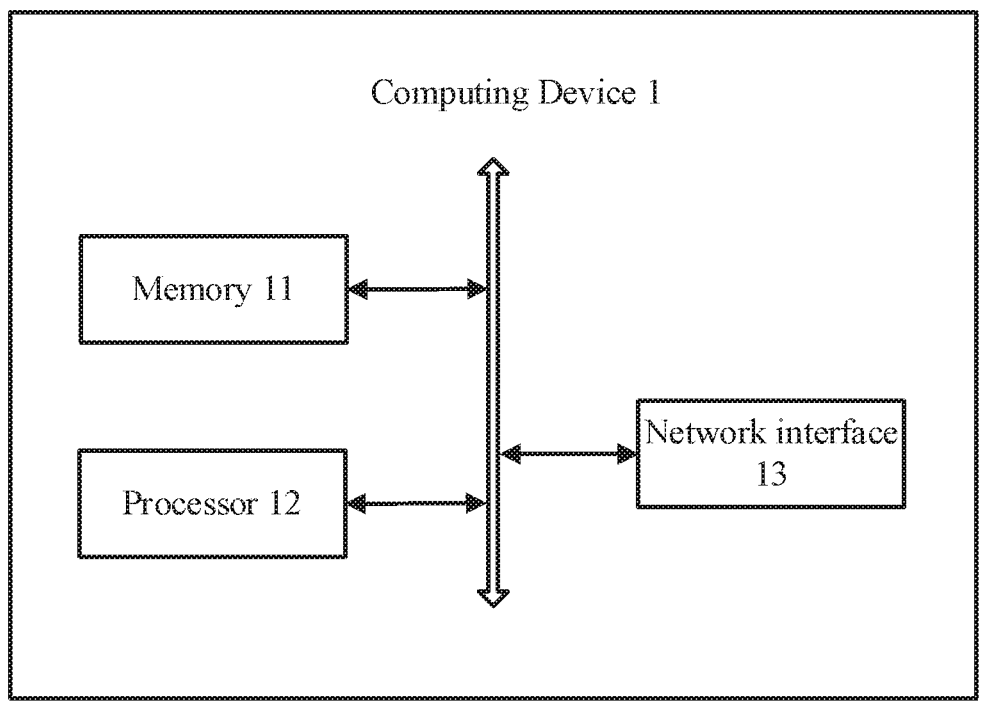
FIG. 1 illustrates a schematic diagram of hardware architecture of a Computing Device 1 according to an embodiment of the present invention.

The objectives, functional features and advantages of the present invention will be further described in conjunction with the embodiments and with reference to the drawings. In order to make objectives, technical solutions and advantages of the present invention more clear, the present invention will be further described in detail below in conjunction with accompanying drawings and embodiments. It should be understood that the specific embodiments described herein are only used to explain the present invention and are not intended to limit the present invention. Based on the embodiments of the present invention, all other embodiments obtained by those of ordinary skilled in the art without making creative efforts fall within the protection scope of the present invention.

It should be noted that the descriptions related to "first", "second", etc. in the present invention are for descriptive purposes only and cannot be understood as indicating or implying their relative importance or implicitly indicating the number of indicated technical features. Thus, the features defined with "first" and "second" may include at least one of the features either explicitly or implicitly. In addition, the technical solutions between the various embodiments can be combined with each other, but it must be based on the ability of ordinary skilled in the art to achieve, when the combination of technical solutions conflicts with each other or cannot be realized, it should be considered that the combination of such technical solutions does not exist and is not within the scope of protection required by the present invention.

In view of this, the present invention provides a method for video playing, a device, computing device and computer readable storage medium: obtaining a video duration and a playing duration of a current video segment; then querying a current video node corresponding to the current video segment and a first directing message associated with the current video node in a video playing plot graph; When the playing duration of the current video segment is close to the video duration of the current video segment, querying the next video node of the current video node in the video playing plot graph according to the first directing message; and obtaining a next video segment corresponding to the next video node, and playing the next video segment continuously after the current video segment is completely played. Through the above methods, a playing relationship of different types of video segments is established through a video playing plot graph, thereby achieving automatic and seamless connection playing between the video segments, and meet user's customized viewing needs for video segments.

First, in order to achieve the above object, the present invention provides a method for video playing, the method comprises:

obtaining a video duration and a playing duration of a current video segment; querying a current video node corresponding to the current video segment and a first directing message associated with the current video node in a video playing plot graph; wherein, the video playing plot graph is pre-created and comprises multiple video nodes, and each video node corresponds to a video segment and is associated with a directing message for directing to a next video node; when the playing duration of the current video segment is close to the video duration of the current video segment, querying the next video node of the current video node in the video playing plot graph according to the first directing message; and obtaining a next video segment corresponding to the next video node, and playing the next video segment continuously after the current video segment is completely played.

According to a preferred embodiment of the present application, the video playing plot graph is a video node set based on a directed graph structure.

According to a preferred embodiment of the present application, the first directing message comprises one of an option directing message, a randomly directing message, a quick directing message, and a plot directing message.

According to a preferred embodiment of the present application, when the first directing message is the option directing message, the step of querying the next video node of the current video node in the video playing plot graph according to the first directing message comprises: displaying an option menu corresponding to the option directing message; wherein, the option menu is corresponding to the option directing message, is pre-created and comprises multiple video node options; and receiving the next video node selected by a user through the option menu.

According to a preferred embodiment of the present application, the method further comprises: when the first directing message is the randomly directing message, selecting randomly an un-played video node in the video playing plot graph as the next video node; and when the first directing message is the quick directing message, querying the video node in the quick directing message directly as the next video node; wherein, one quick directing message comprises one video node.

According to a preferred embodiment of the present application, when the first directing message is the plot directing message, each video node in the video playing plot graph is also set with a plot variable value correspondingly and an unlocked plot variable value; the step of querying the next video node of the current video node in the video playing plot graph according to the first directing message comprises: finding out video segments that have been played; querying played video nodes correspondingly according to the video segments that have been played in the video playing plot graph; counting the plot variable value of each of the played video nodes, and adding up to obtain a total plot variable value; and finding a video node with the unlocked plot variable value less than or equal to the total plot variable value as the next video node in the video playing plot graph.

According to a preferred embodiment of the present application, the step of playing the next video segment continuously after the current video segment is completely played comprises: obtaining a video format of the next video segment; determining whether the video format of the next segment video is applicable for a current video player component of a video player according to a correspondence table of video player components and video formats; wherein, the correspondence table of video player components and video formats is pre-created, comprises a variety of video formats and is a relationship table of corresponding player components applicable to each video format; and when the video format of the next video segment is applicable to the current video player component, splicing the next video segment to the end of the current video segment for playing.

According to a preferred embodiment of the present application, the step of splicing the next video segment to the end of the current video segment for playing comprises: adding the next video segment to a play queue of the current video player component; and superimposing the video duration of the current video segment as an offset to the beginning of the next video segment, and updating a total video playing duration of the current video player component.

According to a preferred embodiment of the present application, the method further comprises: when the video format of the next video segment is not applicable to the current video player component, querying a second video player component applicable for the video format of the next video segment according to the correspondence table of video player components and video formats; initializing the second video player component and preloading the next video segment to the second video player component; and after the current video segment is completely played, replacing the current video player component with the second video player component, and playing the next video segment.

In addition, in order to achieve the above object, the present invention provides a device for video playing, the device comprises:

an obtaining module, obtaining a video duration and a playing duration of a current video segment; a first querying module, querying a current video node corresponding to the current video segment and a first directing message associated with the current video node in a video playing plot graph; wherein, the video playing plot graph is pre-created and comprises multiple video nodes, and each video node corresponds to a video segment and is associated with a directing message for directing to a next video node a second querying module, when the playing duration of the current video segment is close to the video duration of the current video segment, querying the next video node of the current video node in the video playing plot graph according to the first directing message; and a playing module, obtaining a next video segment corresponding to the next video node, and playing the next video segment continuously after the current video segment is completely played.

Further, the present invention also provides a computing device, which comprises a memory, a processor, and computer programs that stored in the memory and operable on the processor, wherein the processor executes the computer programs for implementing the steps of method for video playing described above.

Further, in order to achieve the above object, the present invention also provides a computer-readable storage medium, which stores computer programs that upon execution by a processor cause the processor to implement the steps of method for video playing described above.

Figure 2:
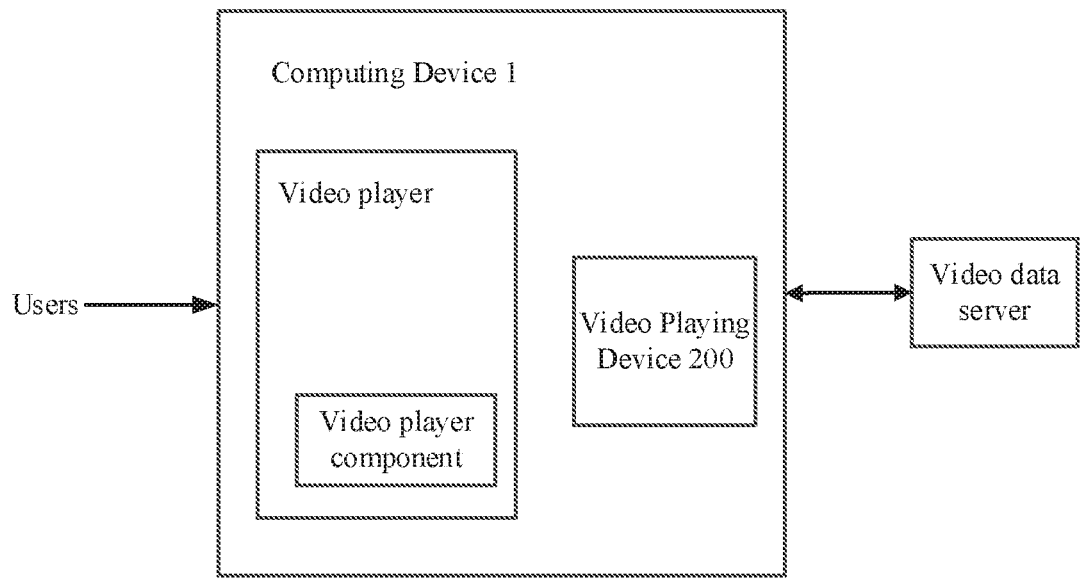
FIG. 2 illustrates a scenario diagram of an application environment according to an embodiment of the present invention.

Compared to existing technology, the method for video playing, device, computing device and computer readable storage medium provided in the present invention: obtain a video duration and a playing duration of a current video segment; then query a current video node corresponding to the current video segment and a first directing message associated with the current video node in a video playing plot graph; when the playing duration of the current video segment is close to the video duration of the current video segment, query the next video node of the current video node in the video playing plot graph according to the first directing message; finally obtain a next video segment corresponding to the next video node, and play the next video segment continuously after the current video segment is completely played. Through the above methods, a playing relationship of different types of video segments is established through a video playing plot graph, thereby achieving automatic and seamless connection playing between the video segments, and meeting user's customized viewing needs for video segments. Referring to FIG. 1, FIG. 1 is a schematic diagram of hardware architecture of a Computing Device 1 according to an embodiment of the present invention; Referring to FIG. 2, FIG. 2 is a scenario diagram of an application environment according to an embodiment of the present invention.

In the embodiment, the Computing Device 1 may include, but not limited to, a memory 11, a processor 12, and a network interface 13 that can be connected to each other through a system bus. The Computing Device 1 is connected to a network through the network interface 13 (which is not shown in FIG. 1), and connected to a video data server through the network. Of course, in other embodiments, the Computing Device 1 may also be connected to other terminal devices such as a mobile terminal, a user equipment (UE), a mobile phone (handset), a portable equipment, PC endpoints and so on (which is not shown in FIG. 2), and perform data interaction with users through the other terminal devices. The network may be an Intranet, an Internet, a global system of mobile communication (GSM), a wideband code division multiple access (WCDMA), a 4G network, a 5G Network, a Bluetooth, Wi-Fi, a call network and other wireless or wired networks.

It should be noted that FIG. 1 only shows the Computing Device 1 including components 11-13, but it should be understood that it is not required to implement all the components shown, and more or fewer components may be implemented instead.

Wherein, the memory 11 includes at least one type of readable storage medium, the readable storage medium includes a flash memory, a hard disk, a multimedia card, a card-type memory (for example, SD or DX memory, etc.), a random access memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic Disk, an Optical Disk and so on. In some embodiments, the memory 11 may be an internal storage unit of the Computing Device 1, such as the hard disk or the memory of the Computing Device 1. In other embodiments, the memory 11 may also be an external storage device of the Computing Device 1, such as a plug-in hard disk equipped with the Computing Device 1, a Smart Media Card (SMC), a secure digital (SD) card, a flash card and so on. Of course, the memory 11 may also include both the internal storage unit of the Computing Device 1 and its external storage device. In the embodiment, the memory 11 is generally used to store an operating system and various application software installed on the Computing Device 1, such as program codes of a Video Playing Device 200. In addition, the memory 11 can also be used to temporarily store various types of data that have been output or will be output.

In some embodiments, the processor 12 may be a central processing unit (CPU), a controller, a microcontroller, a microprocessor, or other data processing chip. The processor 12 is generally used to control an overall operation of the Computing Device 1, for example, to perform control and processing related to data interaction or communication. In the embodiment, the processor 12 is used to run program codes or process data stored in the memory 11, for example, to run an application program corresponding to a video player, and to run the Video Playing Device 200. The video player includes a video player component, and the video player component is called as a sub-function unit by the video player. In the embodiment, the Video Playing Device 200 is a functional unit independent of the video player. In other embodiments, the Video Playing Device 200 may also be a sub-functional unit in the video player. There are no restrictions here.

The network interface 13 may include a wireless network interface or a wired network interface, and the network interface 13 is generally used to establish a communication connection between the Computing Device 1 and other terminal devices such as mobile terminals, user equipment, mobile phones and portable devices, PC terminals, video data servers and so on.

A server of a video website provides different types of video segments to a user through a video playing page, and the video segments are played through a video player of the video playing page respectively. Unlike existing video websites that are generally only able to provide the video segments for the user to play separately, the present disclosure provides techniques for realizing a combination of different types of video segments, thereby achieving automatic and seamless playing different video segments so as to meet users' various video-related service requirements.

In the embodiment, when the Video Playing Device 200 is installed and executed in the Computing Device 1, when the Video Playing Device 200 is executed, a video duration and a playing duration of a current video segment is obtained; then a current video node corresponding to the current video segment and a first directing message associated with the current video node are queried in a video playing plot graph; when the playing duration of the current video segment is close to the video duration of the current video segment, the next video node of the current video node in the video playing plot graph is queried according to the first directing message; finally a next video segment corresponding to the next video node is obtained, and the next video segment is played continuously after the current video segment is completely played. Through the above methods, a playing relationship of different types of video segments is established through a video playing plot graph, thereby achieving automatic and seamless connection playing between the video segments, and meeting user's customized viewing needs for video segments.

So far, a hardware structure and functions of related devices and an application environment of various embodiments of the present invention have been described in detail. In the following, various embodiments of the present invention will be proposed based on the above application environment and related devices. First, the present invention provides a Video Playing Device 200.

Figure 3:
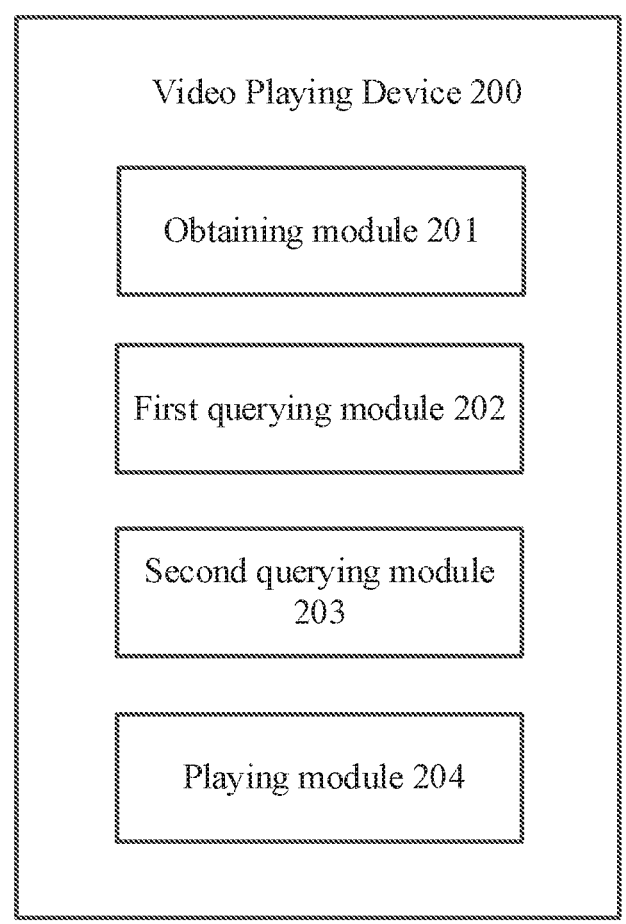
FIG. 3 illustrates a schematic diagram of a program module of a video playing device according to an embodiment of the present invention.

Referring to FIG. 3. FIG. 3 illustrates a schematic diagram of a program module of the Video Playing Device 200 according to an embodiment of the present invention.

In the embodiment, the Video Playing Device 200 includes a series of computer program instructions stored on the memory 11, and when the computer program instructions are executed by the processor 12, a video playing function of each embodiment of the present invention can be implemented. In some embodiments, based on specific operations implemented by various parts of the computer program instructions, the Video Playing Device 200 may be divided into one or more modules. For example, in FIG. 3, the Video Playing Device 200 is divided into an obtaining module 201, a first querying module 202, a second query module 203, and a playing module 204. Wherein:

The obtaining module 201, obtains a video duration and a playing duration of a current video segment.

Specifically, when the Computing Device 1 runs a video player to perform video segment playing, the obtaining module 201 can obtain the video duration and the playing duration of the current video segment being playing by the video player. In the embodiment, the video player generally records an identification, such as a number information, and a playing information of a playing video; the playing information includes the video duration and the playing duration, and the video duration is a total duration required for completely playing the current video segment, the playing duration is a real-time playing duration of the current video segment. Therefore, the obtaining module 201 can obtain the video duration and the playing duration of the current video segment being playing by the video player under authorization.

The first querying module 202, queries a current video node corresponding to the current video segment and a first directing message associated with the current video node in a video playing plot graph. Wherein, the video playing plot graph is pre-created and comprises multiple video nodes, and each video node corresponds to a video segment and is associated with a directing message for directing to a next video node.

Specifically, the Computing Device 1 also provides a video plot graph editor for performing a playing relationship combination of the video segment. Therefore, when a user uploads a video segment, the user can also edit the video playing plot graph through the video plot graph editor to control a playing of the uploaded video segment. In the embodiment, the video playing plot graph is a video node set based on a directed graph structure. The directed graph structure indicates that each video node in the video playing plot graph has other video nodes connected with each other, such as a previous video node or a next video node. Each video node in the video playing plot graph represents a video segment. For example, the video playing plot graph fills the identification information of each video segment to the video node, and then after the obtaining module 201 obtains the identification information of the current video segment being played by the video player, the first querying module 202 can query the corresponding current video node in the video playing plot graph.

Each video node in the video playing plot graph is also associated with corresponding directing message. For example, the current video node in the video playing plot graph is associated with the first directing message, and the first directing message is used to point to the next video node of the current video node in the video playing plot graph. Therefore, after querying the current video node, the first querying module 202 may then query the corresponding first directing message in the video playing plot graph according to the current video node.

In the embodiment, the first directing message includes one of an option directing message, a randomly directing message, a quick directing message, and a plot directing message.

The second querying module 203, when the playing duration of the current video segment is close to the video duration of the current video segment, queries the next video node of the current video node in the video playing plot graph according to the first directing message.

In the embodiment, because the obtaining module 201 can obtain the video duration and the playing duration of the current video segment being playing by the video player under authorization, therefore, the second querying module 203 determines whether the playing duration is close to the video duration of the current video segment, according to the video duration and the playing duration of the current video segment obtained by the obtaining module 201. For example, when the video duration minus the playing duration is less than a preset duration threshold, such as 2 minutes, the playing duration is considered to be close to the video duration. When the playing duration of the current video segment is close to the video duration of the current video segment, the second querying module 203 queries the next video node of the current video node in the video playing plot graph according to the first directing message. Wherein:

When the first directing message is the option directing message, the second querying module 203 further displays an option menu corresponding to the option directing message on a playing screen of the current video segment of the video player; wherein, the option menu is corresponding to the option directing message, is pre-created and includes multiple video node options. Then the second querying module 203 receives the next video node selected by a user through the option menu. Of course, when the second querying module 203 displays the option menu, the second querying module 203 also displays the identification information or actual names of the video segments corresponding to the multiple video nodes in the option menu, in order to be convenient for the user to intuitively select the next video node corresponding to the video segment that the user wants to watch. For example, the current video segment is named of "Episode 1 of TV series A", then when the playing duration of "Episode 1 of TV series A" is close to the video duration of "Episode 1 of TV series A", for example, when "Episode 1 of TV series A" is at an end with one minute left, the second querying module 203 displays the option menu including multiple video node options according to the option directing message, such as the option menu including "Episode 2 of TV series A", "Episode 3 of TV series A" and "Episode 1 of TV series B". The second querying module 203 receives the user's selection, such as "Episode 1 of TV series B", then regards the "Episode 1 of TV series B" as the next video node (a next segment video to be played).

When the first directing message is the randomly directing message, the second querying module 203 randomly selects an un-played video node in the video playing plot graph as the next video node. For example, the current video segment is named of "Episode 1 of TV series A", then when the playing duration of "Episode 1 of TV series A" is close to the video duration of "Episode 1 of TV series A", for example, when "Episode 1 of TV series A" is at the end with one minute left, the second querying module 203, according to un-played video node included in the video playing plot graph, such as "Episode 4 of TV series A", "Episode 5 of TV series A" and "Episode 2 of TV series B", randomly selects one video node, such as "Episode 2 of TV series B", as the next video node.

When the first directing message is the quick directing message, the second querying module 203 directly queries the video nodes in the quick directing message as the next video node; wherein, one quick directing message includes one video node. For example, the current video segment is named of "Episode 1 of TV series A", then when the playing duration of "Episode 1 of TV series A" is close to the video duration of "Episode 1 of TV series A", for example, when "Episode 1 of TV series A" is at the end with one minute left, the second querying module 203 queries the next video node of the current video node included in the quick directing message, such as "Episode 6 of TV series A", as the next video node.

When the first directing message is the plot directing message, each video node in the video playing plot graph is also set with a plot variable value correspondingly and an unlocked plot variable value. The second querying module 203 finds out video segments that have been played, then queries a played video node correspondingly according to the video segments that have been played in the video playing plot graph, sequentially counts the plot variable value of each of the played video nodes, and adds up to obtain a total plot variable value; and finally finds the video node with the unlocked plot variable value less than or equal to the total plot variable value as the next video node in the video playing plot graph.

Specifically, when the user edits the video playing plot graph through the video plot graph editor, if the directing message set with each video node in the video playing plot graph is the plot directing message, the user will be asked for setting the corresponding plot variable value and unlocked plot variable value for each video node by the video plot graph editor. For example, the video playing plot graph includes three video nodes named "Episode 1 of TV series C", "Episode 2 of TV series C" and "Episode 3 of TV series C", which are respectively set the plot variable value and unlocked plot variable value with (1, 0), (1, 2), (1, 1). The current video segment played by the video player is named of "Episode 1 of TV series C", then when the playing duration of "Episode 1 of TV series C" is close to the video duration of "Episode 1 of TV series C", for example, when "Episode 1 of TV series C" is at the end with one minute left, the second querying module 203 counts each executed video node, that is, the plot variable value of the video segment "Episode 1 of TV series C" that has been played is 1, and the total plot variable value is added up to be 1; then the second querying module 203 finds the video node with the unlocked plot variable value less than or equal to the total plot variable value (the unlocked plot variable value is less than or equal to 1) in the video playing plot graph, such as "Episode 1 of TV series C", as the next video node.

The playing module 204, obtains a next video segment corresponding to the next video node, and plays the next video segment continuously after the current video segment is completely played.

In the embodiment, the playing module 204, first obtains the next video segment corresponding to the next video node according to the video playing plot graph, then obtains a video format of the next video segment, then the playing module 204 determines whether the video format of the next segment video is applicable for a current video player component of the video player according to a correspondence table of video player components and video formats. Wherein, the correspondence table of video player components and video formats is pre-created, comprises a variety of video formats and is a relationship table of corresponding player components applicable to each video format.

Specifically, for video files of different video formats, a video player component applicable for the video format is required to parse video data in the video format before being displayed by the video player. Therefore, the Computing Device 1 creates the correspondence table of video player components and video formats in advance, and the correspondence table of video player components and video formats is pre-created, includes a variety of video formats and is the relationship table of corresponding player components applicable to each video format. After querying the next video node of the video node corresponding to the current video segment, the second querying module 203 further obtains the video format of the next video segment corresponding to the next video node, and then compares whether the video format of the next video segment is applicable to the current video player component of the video player according to the correspondence table of video player components and video formats.

When determining that the video format of the next video segment is applicable to the current video player component, the playing module 204 splices the next video segment to the end of the current video segment for playing. In the embodiment, the playing module 204 adds the next video segment to a play queue of the current video player component of the video player, then superimposes the video duration of the current video segment as an offset to the beginning of the next video segment, and updates a total video playing duration of the current video player component. Therefore, after playing the current video segment, the current video player component can seamlessly play the next video segment.

When determining the video format of the next video segment is not applicable to the current video player component, the playing module 204 queries a second video player component applicable for the video format of the next video segment according to the correspondence table of video player components and video formats; then initializes the second video player component and preloads the next video segment to the second video player component. Afterwards, after the current video segment is completely played, the playing module 204 replaces the current video player component with the second video player component, and plays the next video segment. Thereby, the next video segment can be seamlessly connection played after playing the current video segment.

From the above, the Computing Device 1 can obtain a video duration and a playing duration of a current video segment; then query a current video node corresponding to the current video segment and a first directing message associated with the current video node in a video playing plot graph; when the playing duration of the current video segment is close to the video duration of the current video segment, query the next video node of the current video node in the video playing plot graph according to the first directing message; finally obtain a next video segment corresponding to the next video node, and play the next video segment continuously after the current video segment is completely played. Through the above methods, a playing relationship of different types of video segments is established through a video playing plot graph, thereby achieving automatic and seamless connection playing between the video segments, and meeting user's customized viewing needs for video segments.

In addition, the present invention also proposes a method for video playing, which is applied to a computing device.

Figure 4:
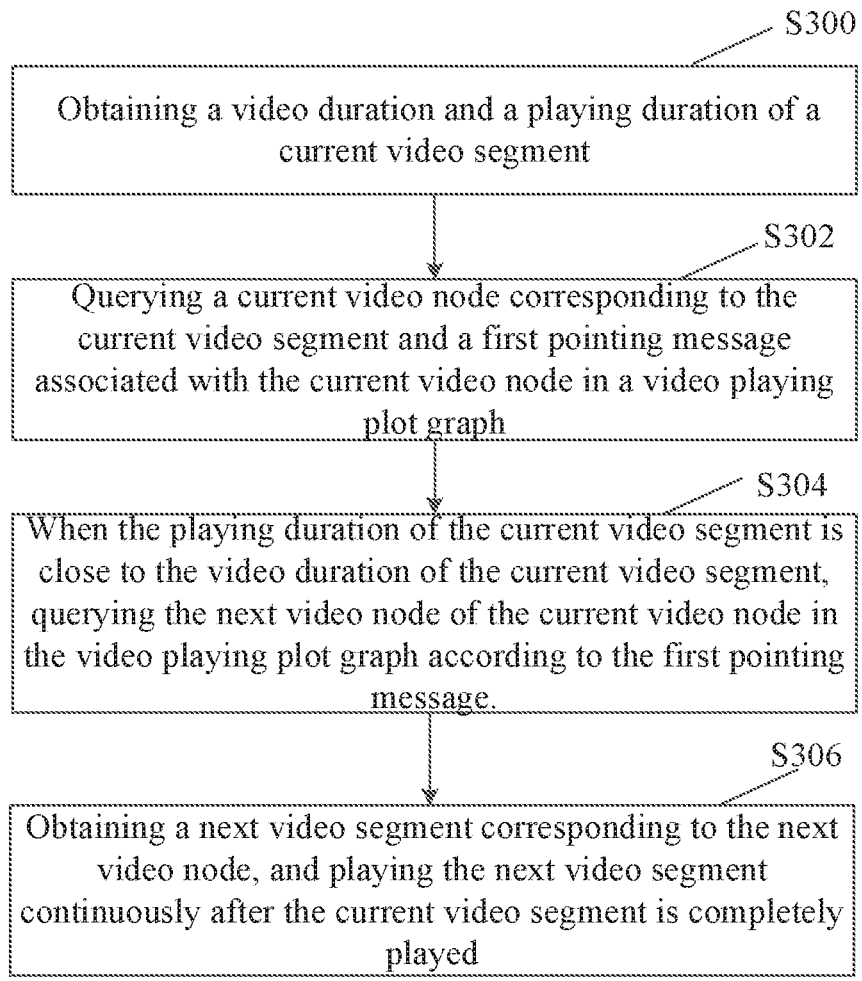
FIG. 4 illustrates a schematic flowchart of a method for video playing according to an embodiment of the present invention.

Referring to FIG. 4, FIG. 4 illustrates a schematic flowchart of the method for video playing according to an embodiment of the present invention, including steps S300 to S306:

Step S300, obtaining a video duration and a playing duration of a current video segment.

Specifically, when running a video player to perform video segment playing, the Computing Device 1 obtains the video duration and the playing duration of the current video segment being playing by the video player. In the embodiment, the video player generally records an identification, such as a number information, and a playing information of a playing video; the playing information includes the video duration and the playing duration, and the video duration is a total duration required for completely playing the current video segment, the playing duration is a real-time playing duration of the current video segment. Therefore, the Computing Device 1 can obtain the video duration and the playing duration of the current video segment being playing by the video player under authorization.

Step S302, querying a current video node corresponding to the current video segment and a first pointing message (i.e., a first directing message) associated with the current video node in a video playing plot graph. Wherein, the video playing plot graph is pre-created and comprises multiple video nodes, and each video node corresponds to a video segment and is associated with a pointing message (i.e., a directing message) for directing to a next video node.

Specifically, the Computing Device 1 also provides a video plot graph editor for performing a playing relationship combination of the video segment. Therefore, when a user uploads a video segment, the user can also edit the video playing plot graph through the video plot graph editor to control a playing of the uploaded video segment. In the embodiment, the video playing plot graph is a video node set based on a directed graph structure. The directed graph structure indicates that each video node in the video playing plot graph has other video nodes connected with each other, such as a previous video node or a next video node. Each video node in the video playing plot graph represents a video segment. For example, the video playing plot graph fills the identification information of each video segment to the video node, and then after the Computing Device 1 obtains the identification information of the current video segment being played by the video player, the Computing Device 1 can query the corresponding current video node in the video playing plot graph.

In the embodiment, each video node in the video playing plot graph is also associated with corresponding directing message. For example, the current video node in the video playing plot graph is associated with the first directing message, and the first directing message is used to point to the next video node of the current video node in the video playing plot graph. Therefore, after querying the current video node, the Computing Device 1 may then query the corresponding first directing message in the video playing plot graph according to the current video node.

Step S304, when the playing duration of the current video segment is close to the video duration of the current video segment, querying the next video node of the current video node in the video playing plot graph according to the first directing message.

Specifically, the Computing Device 1 obtains the video duration and the playing duration of the current video segment, and then determines whether the playing duration is close to the video duration of the current video segment. In the embodiment, when the video duration minus the playing duration is less than a preset duration threshold, such as 2 minutes, the Computing Device 1 determines the playing duration being close to the video duration. When the playing duration of the current video segment is close to the video duration of the current video segment, the Computing Device 1 further queries the next video node of the current video node in the video playing plot graph according to the first directing message.

Step S306, obtaining a next video segment corresponding to the next video node, and playing the next video segment continuously after the current video segment is completely played.

Specifically, the Computing Device 1 obtains the next video segment corresponding to the next video node according to the video playing plot graph, and plays the next video segment continuously after the current video segment is completely played.

Figure 5:
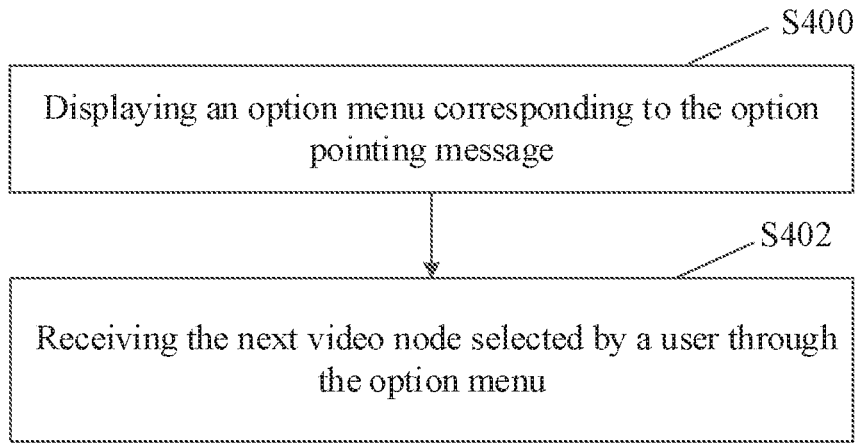
FIG. 5 illustrates a specific flowchart of step S304 in FIG. 4.

Referring to FIG. 5, in an exemplary embodiment, step S304 in FIG. 4 includes steps S400 to S402:

Step S400, displaying an option menu corresponding to the option directing message. Wherein, the option menu is corresponding to the option directing message, is pre-created and includes multiple video node options.

Step S402, receiving the next video node selected by a user through the option menu.

Specifically, the first directing message includes one of an option directing message, a randomly directing message, a quick directing message, and a plot directing message. When the first directing message is the option directing message, the Computing Device 1 displays an option menu corresponding to the option directing message on a playing screen of the current video segment of the video player; wherein, the option menu is corresponding to the option directing message, is pre-created and includes multiple video node options. Then the Computing Device 1 receives the next video node selected by a user through the option menu. Of course, when displaying the option menu, the Computing Device 1 also displays the identification information or actual names of the video segments corresponding to the multiple video nodes in the option menu, in order to be convenient for the user to intuitively select the next video node corresponding to the video segment that the user wants to watch. For example, the current video segment is named of "Episode 1 of TV series A", then when the playing duration of "Episode 1 of TV series A" is close to the video duration of "Episode 1 of TV series A", for example, when "Episode 1 of TV series A" is at an end with one minute left, the Computing Device 1 displays the option menu including multiple video node options according to the option directing message, such as the option menu including "Episode 2 of TV series A". "Episode 3 of TV series A" and "Episode 1 of TV series B". The Computing Device 1 receives the user's selection, such as "Episode 1 of TV series B", then regards the "Episode 1 of TV series B" as the next video node (a next segment video to be played).

Figure 6:
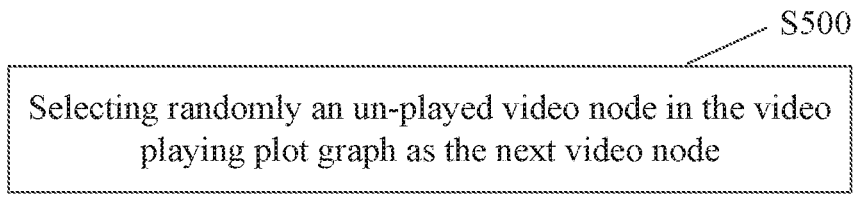
FIG. 6 illustrates another specific flowchart of step S304 in FIG. 4.

Referring to FIG. 6, in another exemplary embodiment, step S304 in FIG. 4 further includes steps S500:

Step S500, selecting randomly an un-played video node in the video playing plot graph as the next video node.

Specifically, when the first directing message is the randomly directing message, the Computing Device 1 randomly selects an un-played video node in the video playing plot graph as the next video node. For example, the current video segment is named of "Episode 1 of TV series A", then when the playing duration of "Episode 1 of TV series A" is close to the video duration of "Episode 1 of TV series A", for example, when "Episode 1 of TV series A" is at the end with one minute left, the Computing Device 1, according to un-played video node included in the video playing plot graph, such as "Episode 4 of TV series A", "Episode 5 of TV series A" and "Episode 2 of TV series B", randomly selects one video node, such as "Episode 2 of TV series B", as the next video node.

Figure 7:
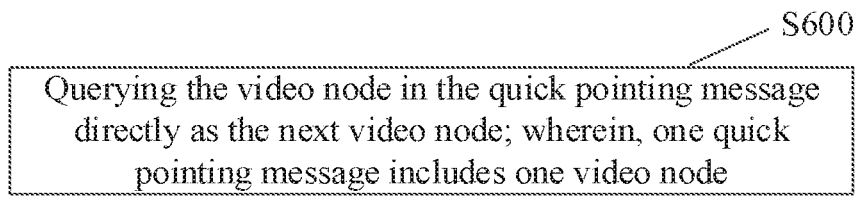
FIG. 7 illustrates another specific flowchart of step S304 in FIG. 4.

Referring to FIG. 7, in another exemplary embodiment, step S304 in FIG. 4 further includes steps S600:

Step S600, querying the video node in the quick directing message directly as the next video node; wherein, one quick directing message includes one video node.

Specifically, when the first directing message is the quick directing message, the Computing Device 1 directly queries the video nodes in the quick directing message as the next video node; wherein, one quick directing message includes one video node. For example, the current video segment is named of "Episode 1 of TV series A", then when the playing duration of "Episode 1 of TV series A" is close to the video duration of "Episode 1 of TV series A", for example, when "Episode 1 of TV series A" is at the end with one minute left, the Computing Device 1 queries the next video node of the current video node included in the quick directing message, such as "Episode 6 of TV series A", as the next video node.

Figure 8:
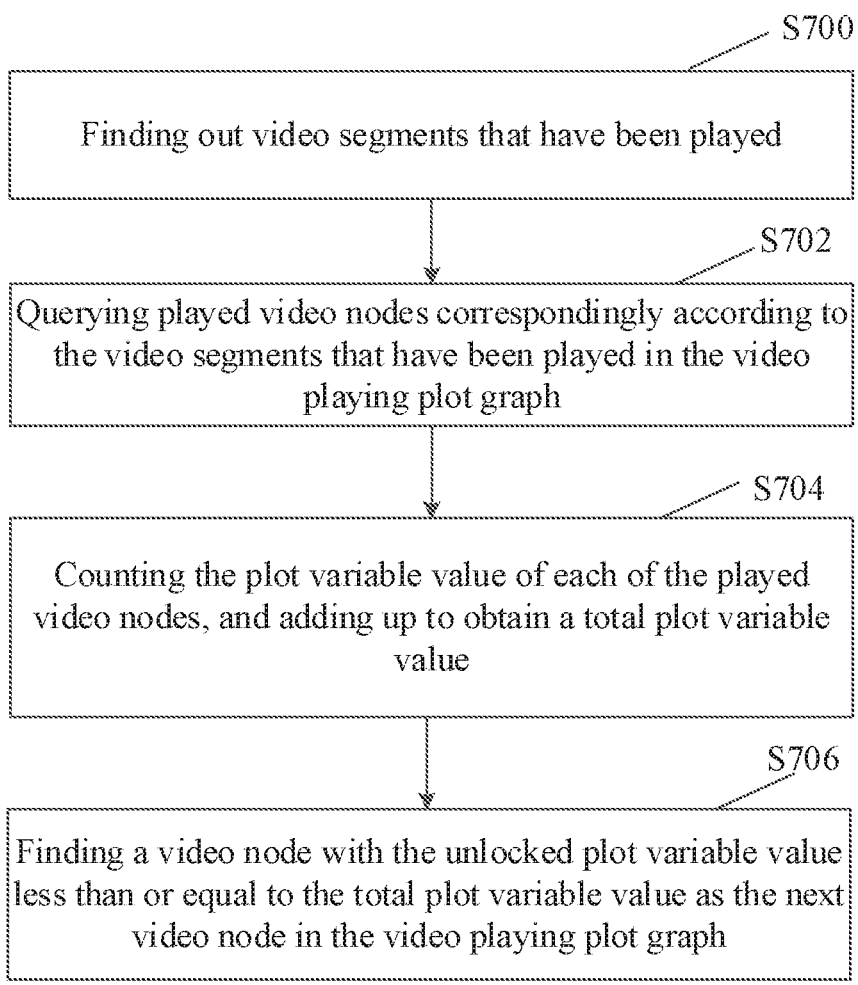
FIG. 8 illustrates another specific flowchart of step S304 in FIG. 4.

Referring to FIG. 8, in another exemplary embodiment, step S304 in FIG. 4 further includes steps S700 to S706:

Step S700, finding out video segments that have been played.

Step S702, querying played video nodes correspondingly according to the video segments that have been played in the video playing plot graph.

Step S704, counting the plot variable value of each of the played video nodes, and adding up to obtain a total plot variable value.

Step S706, finding a video node with the unlocked plot variable value less than or equal to the total plot variable value as the next video node in the video playing plot graph.

Specifically, when the first directing message is the plot directing message, each video node in the video playing plot graph is also set with a plot variable value correspondingly and an unlocked plot variable value. The Computing Device 1 finds out video segments that have been played, then queries a played video node correspondingly according to the video segments that have been played in the video playing plot graph, sequentially counts the plot variable value of each of the played video nodes, and adds up to obtain a total plot variable value; and finally finds the video node with the unlocked plot variable value less than or equal to the total plot variable value as the next video node in the video playing plot graph.

In the embodiment, when the user edits the video playing plot graph through video plot graph editor, if the directing message set with each video node in the video playing plot graph is the plot directing message, the user will be asked for setting the corresponding plot variable value and unlocked plot variable value for each video node by video plot graph editor. For example, the video playing plot graph includes three video nodes named "Episode 1 of TV series C", "Episode 2 of TV series C" and "Episode 3 of TV series C", which are respectively set the plot variable value and unlocked plot variable value with (1, 0), (1, 2), (1, 1). The current video segment played by the video player is named of "Episode 1 of TV series C", then when the playing duration of "Episode 1 of TV series C" is close to the video duration of "Episode 1 of TV series C", for example, when "Episode 1 of TV series C" is at the end with one minute left, the Computing Device 1 counts each executed video node, that is, the plot variable value of the video segment "Episode 1 of TV series C" that has been played is 1, and the total plot variable value is added up to be 1; then the Computing Device 1 finds the video node with the unlocked plot variable value less than or equal to the total plot variable value (the unlocked plot variable value is less than or equal to 1) in the video playing plot graph, such as "Episode 1 of TV series C", as the next video node.

Figure 9:
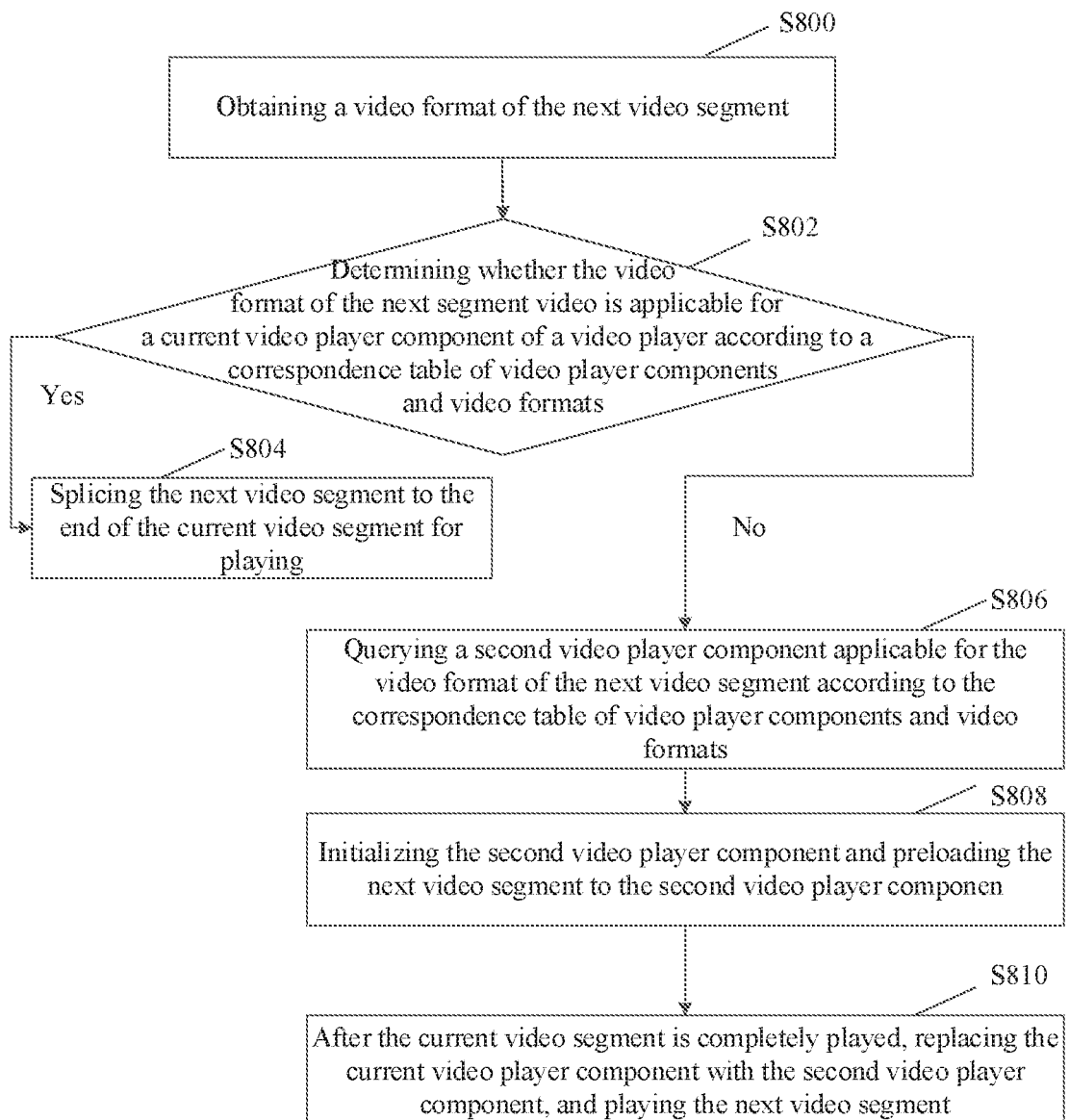
FIG. 9 illustrates another specific flowchart of step S306 in FIG. 4.

Referring to FIG. 9, in an exemplary embodiment, step S306 in FIG. 4 includes steps S800 to S810:

Step S800, obtaining a video format of the next video segment.

Step S802, determining whether the video format of the next segment video is applicable for a current video player component of a video player according to a correspondence table of video player components and video formats. Wherein, the correspondence table of video player components and video formats is pre-created, includes a variety of video formats and is a relationship table of corresponding player components applicable to each video format.

When the video format of the next segment video is applicable for the current video player component, step S804 is executed; otherwise, step S806 is executed.

In the embodiment, the Computing Device 1 first obtains the next video segment corresponding to the next video node according to the video playing plot graph, then obtains a video format of the next video segment, then the Computing Device 1 determines whether the video format of the next segment video is applicable for a current video player component of the video player according to a correspondence table of video player components and video formats. Wherein, the correspondence table of video player components and video formats is pre-created, comprises a variety of video formats and is a relationship table of corresponding player components applicable to each video format.

Specifically, for video files of different video formats, a video player component applicable for the video format is required to parse video data in the video format before being displayed by the video player. Therefore, the Computing Device 1 creates the correspondence table of video player components and video formats in advance, and the correspondence table of video player components and video formats is pre-created, includes a variety of video formats and is the relationship table of corresponding player components applicable to each video format. After querying the next video node of the video node corresponding to the current video segment, the Computing Device 1 further obtains the video format of the next video segment corresponding to the next video node, and then compares whether the video format of the next video segment is applicable to the current video player component of the video player according to the correspondence table of video player components and video formats. When the video format of the next segment video is applicable for the current video player component, step S804 is executed; otherwise, step S806 is executed.

Step S804, splicing the next video segment to the end of the current video segment for playing.

Step S806, querying a second video player component applicable for the video format of the next video segment according to the correspondence table of video player components and video formats.

Step S808, initializing the second video player component and preloading the next video segment to the second video player component.

Step S810, after the current video segment is completely played, replacing the current video player component with the second video player component, and playing the next video segment.

Specifically, when determining the video format of the next video segment is not applicable to the current video player component, the Computing Device 1 queries the second video player component applicable for the video format of the next video segment according to the correspondence table of video player components and video formats; then initializes the second video player component and preloads the next video segment to the second video player component. Afterwards, after the current video segment is completely played, the playing module 204 replaces the current video player component with the second video player component, and plays the next video segment. Thereby, the next video segment can be seamlessly connection played after playing the current video segment.

Figure 10:
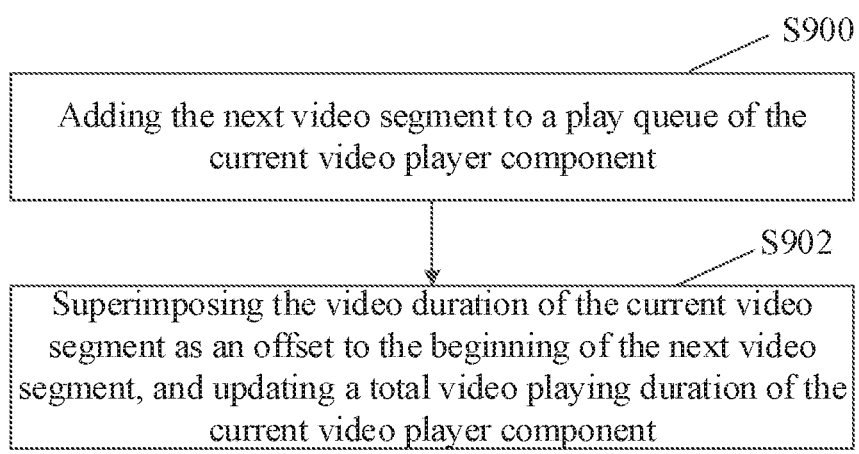
FIG. 10 illustrates another specific flowchart of step S804 in FIG. 9.

Referring to FIG. 10, in an exemplary embodiment, step S306 in FIG. 9 further includes steps S900 to S902:

Step S900, adding the next video segment to a play queue of the current video player component.

Step S902, superimposing the video duration of the current video segment as an offset to the beginning of the next video segment, and updating a total video playing duration of the current video player component.

When determining that the video format of the next video segment is applicable to the current video player component, the Computing Device 1 splices the next video segment to the end of the current video segment for playing. In the embodiment, the Computing Device 1 to adds the next video segment to a play queue of the current video player component of the video player, then superimposes the video duration of the current video segment as an offset to the beginning of the next video segment, and updates a total video playing duration of the current video player component. Therefore, after playing the current video segment, the current video player component can seamlessly play the next video segment.

From the above, the method for video playing provided in the embodiment can: obtain a video duration and a playing duration of a current video segment; then query a current video node corresponding to the current video segment and a first directing message associated with the current video node in a video playing plot graph; when the playing duration of the current video segment is close to the video duration of the current video segment, query the next video node of the current video node in the video playing plot graph according to the first directing message; finally obtain a next video segment corresponding to the next video node, and play the next video segment continuously after the current video segment is completely played. Through the above methods, a playing relationship of different types of video segments is established through a video playing plot graph, thereby achieving automatic and seamless connection playing between the video segments, and meeting user's customized viewing needs for video segments.

The sequence numbers of the above embodiments of the present invention are for description only, and do not represent advantages and disadvantages of the embodiments.

Through descriptions of the above embodiments, those skilled in the art can clearly understand that the methods in the above embodiments can be implemented by means of software plus a necessary general hardware platform, and of course, can also be implemented by hardware, but in many cases the former is a better implementation. Based on this understanding, the technical solution of the present invention can be embodied in the form of a software product in essence or part that contributes to the existing technology, and the computer software product is stored in a storage medium (such as ROM/RAM, a magnetic disk and CO), including several instructions to enable a terminal device (which can be a mobile phone, a computer, a server, an air conditioner, or a network device and so on) to perform the methods described in various embodiments of the present invention.

The above are only preferred embodiments of the present invention and do not limit the patent scope of the present invention. Any equivalent structure or equivalent process transformation made by the description and drawings of the present invention, or directly or indirectly used in other related technical fields, are as same reason included in the scope of patent protection of present invention.

What is claimed is:

1. A method for playing videos, comprising:
    obtaining a total duration and a playing duration of a first video segment that is currently being played, wherein the playing duration of the first video segment is a time during which the first video segment has been played;
    determining a first video node corresponding to the first video segment and a first directing message associated with the first video node based on a video playing plot graph, wherein the video playing plot graph is pre-generated and comprises a plurality of video nodes, the first video node is among the plurality of video nodes, and each of the plurality of video nodes corresponds to a video segment and is associated with a directing message;
    determining a second video node based on the first directing message in response to a determination that a difference between the total duration and the playing duration is not greater than a predetermined value, wherein the first directing message comprises information associated with a second video node corresponding to a second video segment;
    obtaining the second video segment based on the second video node; and
    playing the second video segment continuously once the first video segment is finished.

2. The method of claim 1, wherein the video playing plot graph is generated based on a directed graph structure.

3. The method of claim 1, wherein the first directing message comprises an option directing message, a random directing message, a quick directing message, or a plot directing message.

4. The method of claim 3,
    wherein when the first directing message is the option directing message, the determining a second video node based on the first directing message further comprises:
    displaying an option menu corresponding to the option directing message, wherein the option menu corresponds to the option directing message, is pre-generated, and comprises multiple options associated with multiple video nodes; and
    receiving a selection of a video node among the multiple video nodes by a user through the option menu.

5. The method of claim 3, further comprising:
    when the first directing message is the random directing message, randomly identifying an un-played video node included in the video playing plot graph as the second video node, wherein the un-played video node corresponds to a video segment that has not been played; and
    when the first directing message is the quick directing message, directly identifying a video node included in the quick directing message as the second video node.

6. The method of claim 3,
    wherein when the first directing message is the plot directing message, each video node in the video playing plot graph is further associated with a plot variable value and an unlocked plot variable value, and the determining a second video node based on the first directing message further comprises:
    determining one or more video segments that have been played;
    determining one or more video nodes corresponding to the one or more video segments based on the video playing plot graph;
    identifying a plot variable value corresponding to each of the one or more video nodes;
    determining a total plot variable value, wherein the total plot variable value is a sum of the plot variable value corresponding to each of the one or more video nodes; and
    identifying the second video node in the video playing plot graph based on the total plot variable value, wherein the second video node is associated with an unlocked plot variable value that is less than or equal to the total plot variable value.

7. The method of claim 1, wherein the playing the second video segment continuously when the first video segment is finished further comprises:
obtaining a video format of the second video segment; and
determining whether the video format of the second segment video is applicable to a first video player component based on a predetermined table; wherein the first video segment is played by the first video player component and the predetermined table comprises a plurality of video formats and indicates a corresponding video player component applicable to each of the plurality of video formats.

8. The method of claim 7, further comprising:
in response to a determination that the video format of the second video segment is applicable to the first video player component, splicing the second video segment to the end of the first video segment for playing, wherein the splicing the second video segment to the end of the first video segment for playing further comprises:
adding the second video segment to a play queue of the first video player component; and
superimposing the total duration of the first video segment as an offset to a beginning of the second video segment, and updating a total video playing duration of the first video player component.

9. The method of claim 7, further comprising:
in response to a determination that the video format of the second video segment is not applicable to the first video player component, identifying a second video player component applicable to the video format of the second video segment based on the predetermined table;
initializing the second video player component and preloading the second video segment to the second video player component; and
replacing the first video player component with the second video player component when the first video segment is finished; and
playing the second video segment using the second video player component.

10. A computing device of playing videos, comprising
at least one processor; and
at least one memory communicatively coupled to the at least one processor and storing instructions that upon execution by the at least one processor cause the computing device to:
obtain a total duration and a playing duration of a first video segment that is currently being played, wherein the playing duration of the first video segment is a time during which the first video segment has been played;
determine a first video node corresponding to the first video segment and a first directing message associated with the first video node based on a video playing plot graph, wherein the video playing plot graph is pre-generated and comprises a plurality of video nodes, the first video node is among the plurality of video nodes, and each of the plurality of video nodes corresponds to a video segment and is associated with a directing message;
determine a second video node based on the first directing message in response to a determination that a difference between the total duration and the playing duration is not greater than a predetermined value, wherein the first directing message comprises information associated with a second video node corresponding to a second video segment;
obtain the second video segment based on the second video node; and
play the second video segment continuously once the first video segment is finished.

11. The computing device of claim 10, wherein when the first directing message is an option directing message, the at least one memory further storing instructions that upon execution by the at least one processor cause the computing device to:
display an option menu corresponding to the option directing message, wherein the option menu corresponds to the option directing message, is pre-generated, and comprises multiple options associated with multiple video nodes; and
receive a selection of a video node among the multiple video nodes by a user through the option menu.

12. The computing device of claim 10,
wherein when the first directing message is a random directing message, the at least one memory further storing instructions that upon execution by the at least one processor cause the computing device to randomly identify an un-played video node included in the video playing plot graph as the second video node, wherein the un-played video node corresponds to a video segment that has not been played; and
wherein when the first directing message is a quick directing message, the at least one memory further storing instructions that upon execution by the at least one processor cause the computing device to directly identify a video node included in the quick directing message as the second video node.

13. The computing device of claim 10, wherein when the first directing message is a plot directing message, the at least one memory further storing instructions that upon execution by the at least one processor cause the computing device to:
determine one or more video segments that have been played;
determine one or more video nodes corresponding to the one or more video segments based on the video playing plot graph;
identify a plot variable value corresponding to each of the one or more video nodes;
determine a total plot variable value, wherein the total plot variable value is a sum of the plot variable value corresponding to each of the one or more video nodes; and
identify the second video node in the video playing plot graph based on the total plot variable value, wherein the second video node is associated with an unlocked plot variable value that is less than or equal to the total plot variable value.

14. The computing device of claim 10, the at least one memory further storing instructions that upon execution by the at least one processor cause the computing device to:
obtain a video format of the second video segment; and
determine whether the video format of the second segment video is applicable to a first video player component based on a predetermined table; wherein the first video segment is played by the first video player component, and the predetermined table comprises a plurality of video formats and indicates a corresponding video player component applicable to each of the plurality of video formats.

15. The computing device of claim 14, the at least one memory further storing instructions that upon execution by the at least one processor cause the computing device to:
   in response to a determination that the video format of the second video segment is applicable to the first video player component, add the second video segment to a play queue of the first video player component; and
   superimpose the total duration of the first video segment as an offset to a beginning of the second video segment, and updating a total video playing duration of the first video player component.

16. The computing device of claim 14, the at least one memory further storing instructions that upon execution by the at least one processor cause the computing device to:
   in response to a determination that the video format of the second video segment is not applicable to the first video player component, identify a second video player component applicable to the video format of the second video segment based on the predetermined table;
   initialize the second video player component and preload the second video segment to the second video player component; and
   replace the first video player component with the second video player component when the first video segment is finished; and
   play the second video segment using the second video player component.

17. A non-transitory computer-readable storage medium, which stores computer programs that upon execution by a processor cause the processor to implement operations, the operations comprising:
   obtaining a total duration and a playing duration of a first video segment that is currently being played, wherein the playing duration of the first video segment is a time during which the first video segment has been played;
   determining a first video node corresponding to the first video segment and a first directing message associated with the first video node based on a video playing plot graph, wherein the video playing plot graph is pre-generated and comprises a plurality of video nodes, the first video node is among the plurality of video nodes, and each of the plurality of video nodes corresponds to a video segment and is associated with a directing message;
   determining a second video node based on the first directing message in response to a determination that a difference between the total duration and the playing duration is not greater than a predetermined value, wherein the first directing message comprises information associated with a second video node corresponding to a second video segment;
   obtaining the second video segment based on the second video node; and
   playing the second video segment continuously once the first video segment is finished.

18. The non-transitory computer-readable storage medium of claim 17, wherein when the first directing message is an option directing message, the determining a second video node based on the first directing message further comprises:
   displaying an option menu corresponding to the option directing message, wherein the option menu corresponds to the option directing message, is pre-generated, and comprises multiple options associated with multiple video nodes; and
   receiving a selection of a video node among the multiple video nodes by a user through the option menu.

19. The non-transitory computer-readable storage medium of claim 17, the operations further comprising:
   when the first directing message is a random directing message, randomly identifying an un-played video node included in the video playing plot graph as the second video node, wherein the un-played video node corresponds to a video segment that has not been played; and
   when the first directing message is a quick directing message, directly identifying a video node included in the quick directing message as the second video node.

20. The non-transitory computer-readable storage medium of claim 17, wherein when the first directing message is a plot directing message, each video node in the video playing plot graph is further associated with a plot variable value and an unlocked plot variable value, and the determining a second video node based on the first directing message further comprises:
   determining one or more video segments that have been played;
   determining one or more video nodes corresponding to the one or more video segments based on the video playing plot graph;
   identifying a plot variable value corresponding to each of the one or more video nodes;
   determining a total plot variable value, wherein the total plot variable value is a sum of the plot variable value corresponding to each of the one or more video nodes; and
   identifying the second video node in the video playing plot graph based on the total plot variable value, wherein the second video node is associated with an unlocked plot variable value that is less than or equal to the total plot variable value.

* * * * *